United States Patent [19]

Bloch et al.

[11] Patent Number: 4,520,966
[45] Date of Patent: Jun. 4, 1985

[54] WIRE CANISTER FOR A ROBOTIC WIRE HARNESS ASSEMBLY SYSTEM

[75] Inventors: Joseph T. Bloch; Dan A. Cross, both of Seattle, Wash.

[73] Assignee: The Boeing Company, Seattle, Wash.

[21] Appl. No.: 539,768

[22] Filed: Oct. 7, 1983

[51] Int. Cl.³ ............... B65H 75/00; B25G 3/22
[52] U.S. Cl. .................. 242/54 R; 279/114; 414/225; 901/7
[58] Field of Search ............ 242/54, 54.1, 82, 83, 242/72 R, 47, 171, 163; 279/114; 414/225; 901/6, 7, 30

[56] References Cited

U.S. PATENT DOCUMENTS

| | | | |
|---|---|---|---|
| 2,588,938 | 3/1952 | Rogers | 279/114 |
| 2,685,097 | 8/1954 | Allen | 242/54 R X |
| 3,028,169 | 4/1962 | Skillin | 279/114 |
| 3,048,870 | 8/1962 | Criscuolo | 242/54 R |
| 3,254,851 | 6/1966 | Caperton | 242/54 R |
| 3,486,714 | 12/1969 | Gordon | 242/163 X |
| 3,601,326 | 8/1971 | Gordon | 242/163 X |
| 4,151,965 | 5/1979 | Manabe | 242/54 R |
| 4,208,017 | 6/1980 | Ichikawa et al. | 242/82 X |

Primary Examiner—Stuart S. Levy
Assistant Examiner—Leo J. Peters
Attorney, Agent, or Firm—William C. Anderson

[57] ABSTRACT

A wire canister capable of being used by robots during the assembly of a wire harness. The wire canister is capable of accepting, storing and dispensing random lengths of wire, i.e., a wire segment. The leading and trailing ends of the wire segment are constrained in such a way that the ends of the wire segment may be readily acquired by the manipulator of a robot and presented to other supporting equipment for purposes of performing operations on the ends of the wire segment.

10 Claims, 22 Drawing Figures

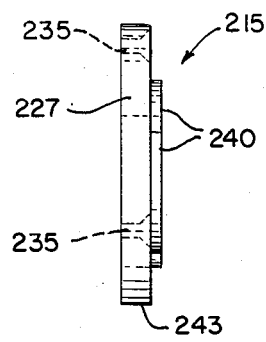
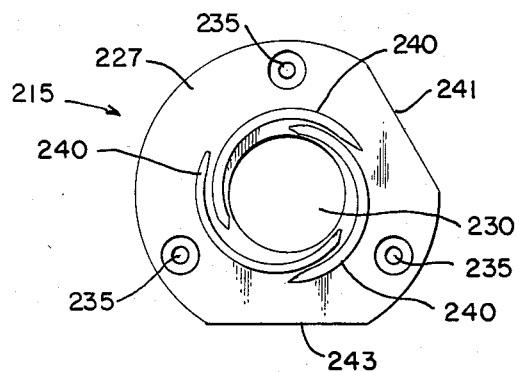
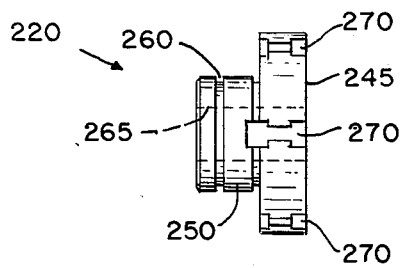
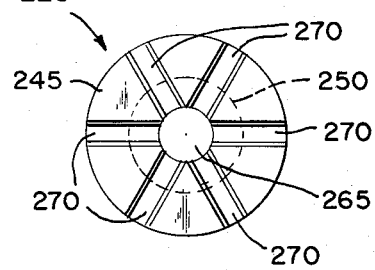
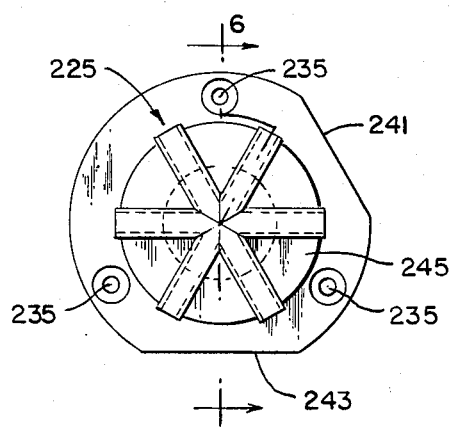
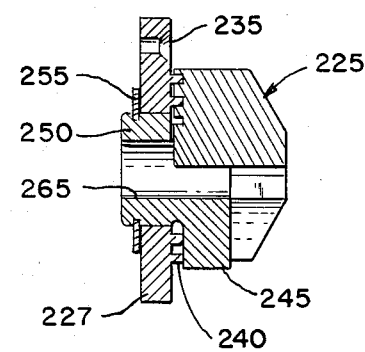
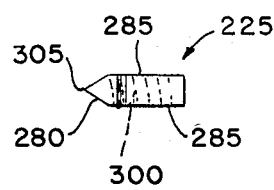
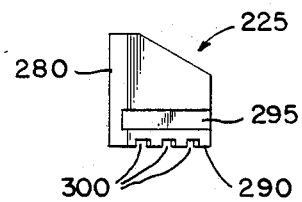
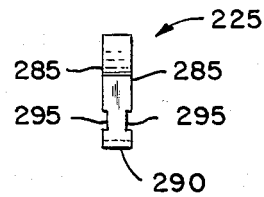

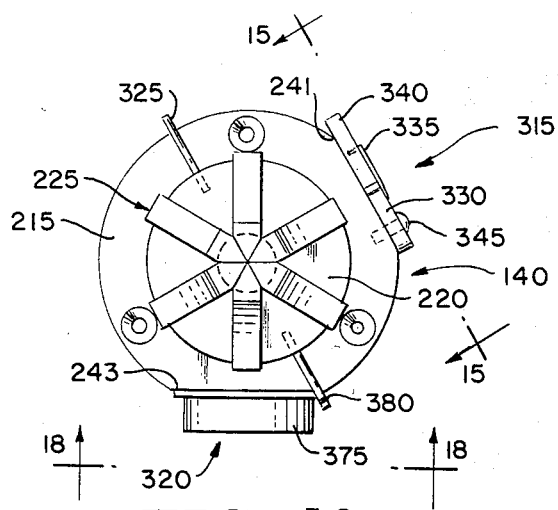
FIG. 14
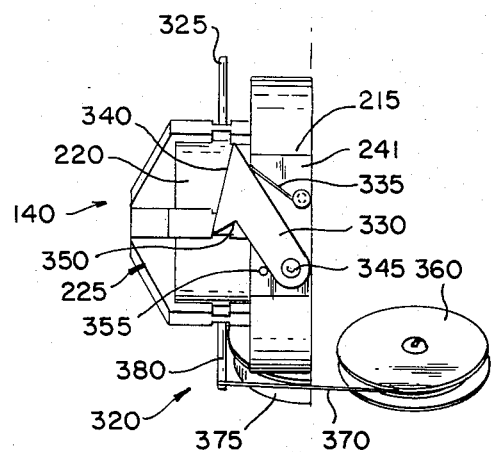
FIG. 15
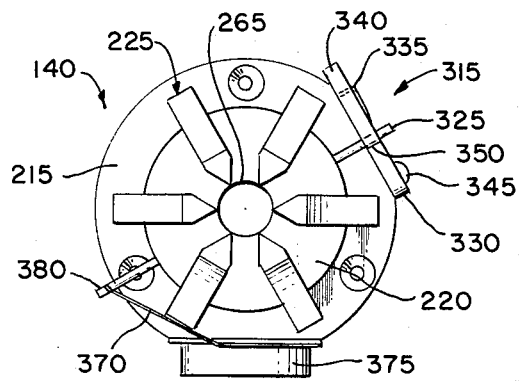
FIG. 17
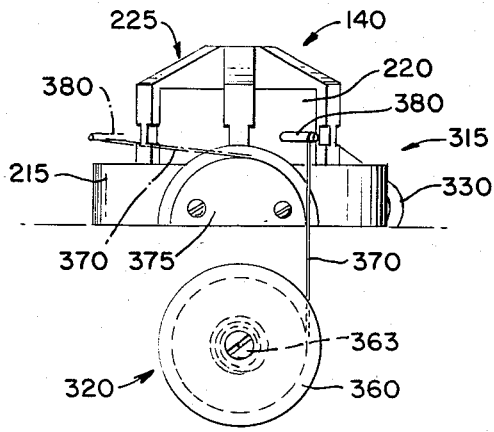
FIG. 18
FIG. 16
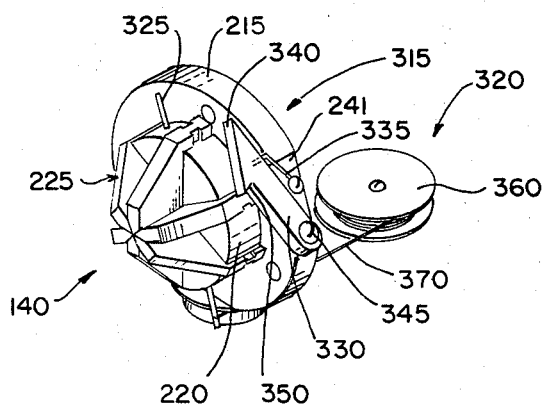

WIRE CANISTER FOR A ROBOTIC WIRE HARNESS ASSEMBLY SYSTEM

TECHNICAL FIELD

The present invention relates to robotics and more particularly relates to a wire canister useful for accepting, storing and dispensing electrical wire segments to be used by one or more robots during the assembly of an electrical wire harness.

BACKGROUND OF THE INVENTION

The Robot Institute of America has defined a robot as " . . . a reprogrammable multi-functional manipulator designed to move material, parts, tools, or specialized devices, through variable program motions for the performance of a variety of tasks." Contemporary industrial robots are helping to make human drudgery a thing of the past in hundreds of manufacturing plants throughout the world. They are helping to improve productivity and reduce manufacturing costs. Industrial robots can handle loads ranging from a few ounces to several thousand pounds. Robots can be trained to perform complex jobs, and through the use of sensors and adaptive controls, robots can cope with changing conditions in the workplace.

One recent application of industrial robots includes the assembly of an electrical wire harness using wire segments (defined hereinafter). The robotic assembly of the wire harness may be facilitated through the use of specialized devices which make it easier for the manipulator of the robot to handle the multitude of wire segments.

A wire segment as used herein is an arbitrary but known discrete length of wire. The type, diameter and terminal end configuration (e.g., connectors, trimmed length, tinned ends, etc.) of the wire may also vary. One important consideration in the robotic assembly of a wire harness is that the robot must be able to sense the ends of the wire segment to accomplish the necessary assembly operations. With this in mind, it is important that any auxiliary equipment facilitating robotic assembly be able to position the ends of the wire segment in predictable locations where the robot manipulator may grip the wire. Another consideration is the storing, transportation, manipulation and handling of a wire segment by the robot. For example, wire tends to be somewhat flacid and may tend to tangle if not handled with care. It is highly desirable, therefore, to provide the robot with a tool facilitating the repetitive handling of a wire segment. In conclusion, it is of paramount importance to present to the robot a uniform package capable of acquiring, storing and dispensing wire segments of various diameters, lengths and terminal end configurations whereby ready, predictable and reliable assembly of the wire harness may be effected.

BRIEF SUMMARY OF THE INVENTION

With the foregoing in mind, it is a principal object of the present invention to provide a transportable canister for accepting, storing and dispensing a wire segment to be used by a robot during the assembly of a wire harness. The canister of the present invention comprises a cylindrical housing having a wire access opening. A cylindrical drum is disposed within the housing with the outer surface of the drum being provided with a helical groove, capable of receiving a wire, and a wire inlet opening. A means is provided for enabling the drum to rotate with respect to the housing. A drive plate, provided with a wire outlet opening, is attached to the drum whereby rotation of the drive plate effects a rotation of the drum. A wire guide tube is disposed within the drum and extends between the inlet opening and the outlet opening to direct the wire from the inlet to the outlet opening. Both the access opening and the outlet opening are provided with a releasable clamp means for constraining and centering either the leading end of the wire and/or the trailing end of the wire.

BRIEF DESCRIPTION OF THE DRAWINGS

FIG. 5 is a top view of a chuck assembly useful with the present invention which has been simplified in the interest of clarity.

FIG. 6 is a cross-sectional side view of the chuck assembly of FIG. 5.

FIG. 7 is a side view of the scroll plate of the chuck assembly of FIG. 5.

FIG. 8 is a top view of the scroll plate of FIG. 7.

FIG. 9 illustrates a side view of the chuck of the chuck assembly of FIG. 5.

FIG. 10 is a top view of the chuck of FIG. 9.

FIG. 11 is a top view of the jaw of the chuck assembly of FIG. 5.

FIG. 12 is a side view of the jaw of FIG. 11.

FIG. 13 is an edge view of the jaw of FIG. 11.

FIG. 14 is a top view of the center chuck assembly of the present invention showing additional detail and illustrating the center chuck assembly in its unlatched or closed condition.

FIG. 15 is a side view taken along line 15—15 in FIG. 14.

FIG. 16 is an isometric view of the center chuck assembly of FIG. 14.

FIG. 17 illustrates the center chuck assembly of FIG. 14 in its latched or open condition.

FIG. 18 is a view taken along line 18—18 in FIG. 14.

DETAILED DESCRIPTION OF THE PREFERRED EMBODIMENT

Figure 1A:
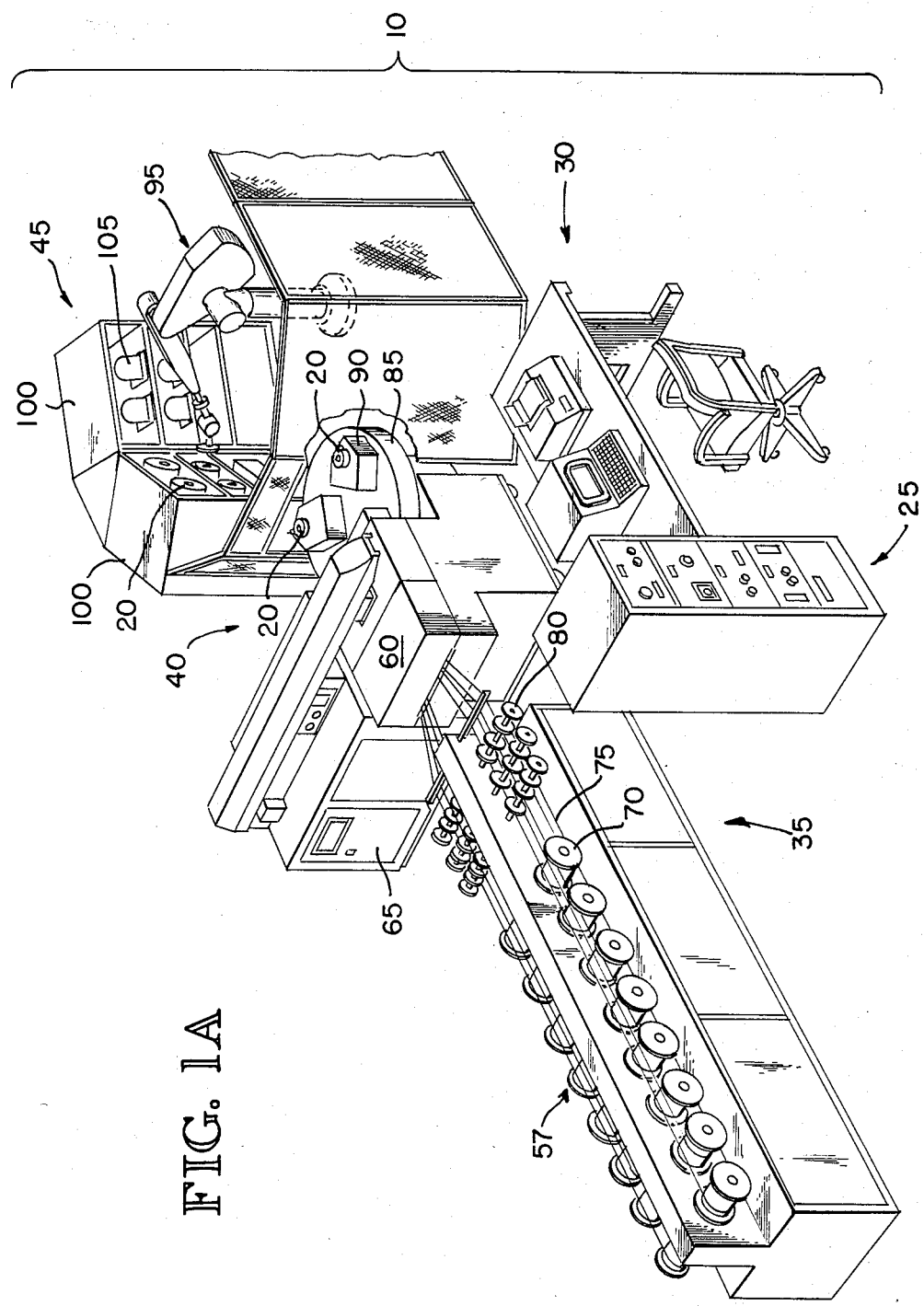
FIGS. 1A and 1B show a robotic wire harness assembly system capable of using the wire canister of the present invention.
Figure 1B:
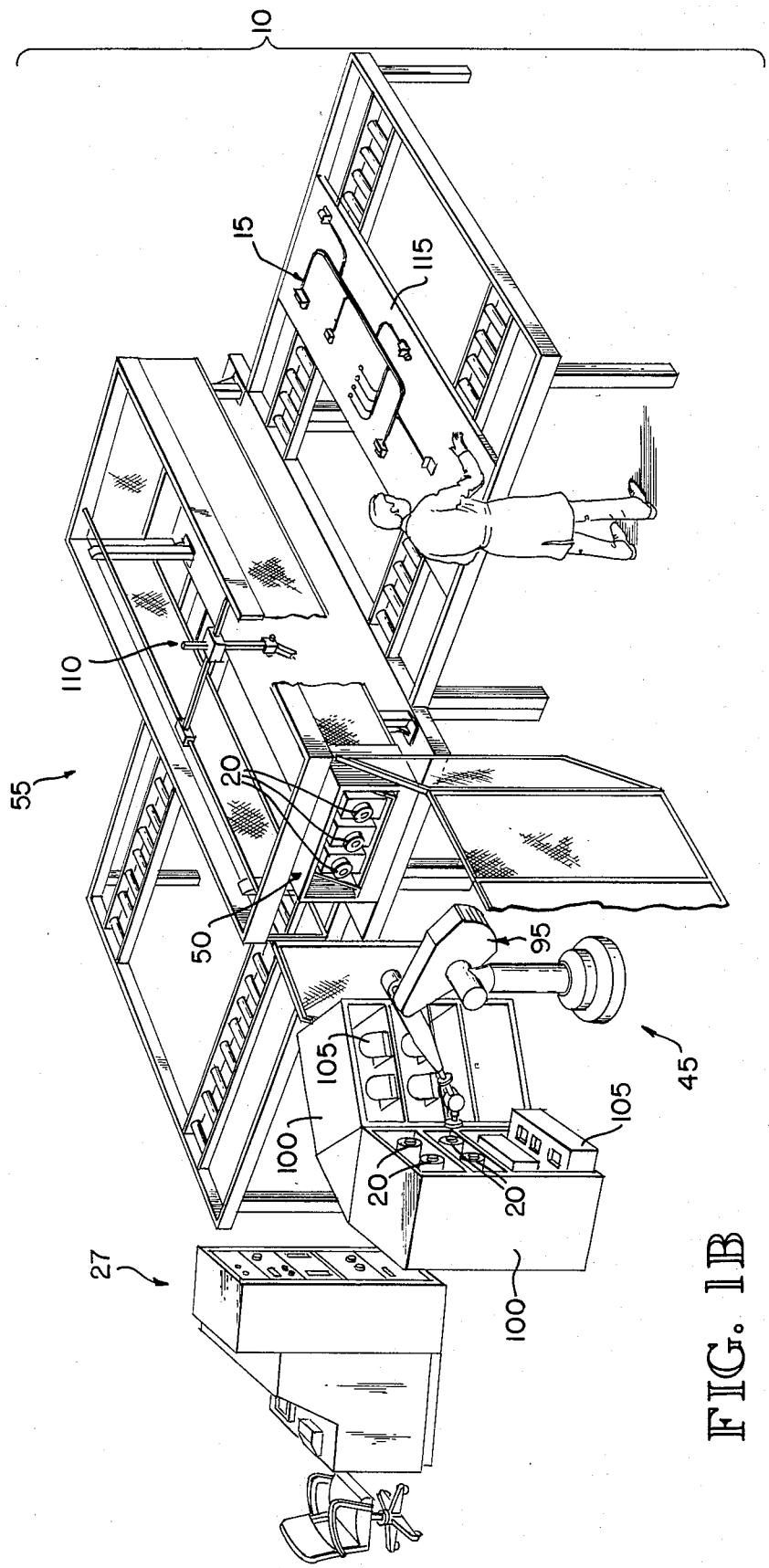

A robotic wire harness assembly system 10 is illustrated in FIGS. 1A and 1B. The assembly system 10 does not form a part of the present invention and will be described only to the degree necessary to understand the utility, functions and advantages of the present invention. The assembly system 10 is an integrated combination of hardware and software capable of performing the task of producing an electrical wire harness 15 (shown generally in FIG. 1B) using the present wire canister shown in detail in FIG. 2 and designated as 20. The assembly system 10 comprises an off-line batch process computer program which will generate the data necessary for controlling the system. This data is transmitted to a system controller 30, a wire preparation subsystem 35, a wire reeling subsystem 40, a wire termination subsystem 45, a wire queuing subsystem 50 and a wire lay-up subsystem 55.

The data generator 25 prepares and organizes all of the variable data required to operate the assembly system 10. The system controller 30 takes the information assembled by the data generator 25 and distributes it to the appropriate subsystem controllers (such as the one generally designated as 27, see FIG. 1B). In addition, the system controller 30 interacts with an operator and the subsystems to control the sequence of activity in the system 10.

The wire preparation subsystem 35 comprises a conventional laser cable marking system. The laser cable marking system comprises a wire de-reeling station 57, a marker/cutter 60 and a control computer. The de-reeling station 57 holds a plurality of wire reels 70 for selection by the marker/cutter 60. Wires 75 are held in constant tension by a series of idler and tensioning pulleys 80 and are fed to the marker/cutter 60 by a positive feed drive (not shown). The marker/cutter 60 consists of a feed (not shown), an alignment system (not shown) which transports and holds a wire 75, a laser (not shown in detail) of suitable power and associated control and targeting equipment (not shown) to mark the wire 75. A guillotine blade actuator (not shown) cuts the wire 75 to form wire segments. In short, the wire preparation subsystem 35 selects, marks, measures and cuts the wire 75 while feeding it into the wire reeling subsystem 40.

The wire reeling subsystem 40 controls the loading of a wire 75 of known length, etc., i.e., a wire segment 77, (see FIG. 2), into the wire canister 20 of the present invention as the wire 75 exits from the wire preparation subsystem 35. The wire reeling subsystem 40 has a rotatable table 85 providing stations 90 for three (3) wire canisters 20: one presented to the wire preparation system 35 and the other two within reach of a wire termination subsystem robot 95. The two canisters 20 within reach of the robot 95 provide one location for an incoming empty canister 20 and one location for an outgoing loaded canister 20.

The wire termination subsystem 45 comprises the robot 95 of conventional design and two equipment racks 100 filled with conventional termination devices 105 (not shown in detail) adapted to be used with a loaded wire canister 20. Termination as used herein is defined as the trimming of the ends of a wire segment 77, stripping and tinning of the ends of the wire segment 77, installing an electrical lug (not shown), and/or the crimping of an electrical contact (not shown) onto one or both of the ends of the wire segment 77. During the termination process, the robot 95 picks up a full canister 20 which has been loaded at the wire reeling subsystem 40 and presents either the leading end or the trailing end of the wire segment 77 stored in the wire canister 20 to the appropriate termination device 105. After both wire ends are properly terminated, the robot 95 places the canister 20 in the wire queuing subsystem 50 and moves to a position where it is capable of repeating the cycle. The robot 95 would be ineffective in performing these tasks if the wire canister 20 of the present invention was not capable of being used as explained earlier. Since the robot can pick up a loaded canister 20 which has been presented to it in a predictable manner, the robot 95 can readily acquire the ends of the wire segment 77 or can easily present the ends of the wire segment 77 to a termination device 105.

The wire queuing subsystem 50 is disposed proximate to another conventional robot 110 comprising the wire lay-up subsystem 55. The wire queuing subsystem 50 performs several functions, e.g., it passes empty or unloaded wire canisters 20 from the wire lay-up subsystem 55 to the wire termination subsystem robot 95 and it feeds wire canisters 20 having terminated wire segments 77 to the wire lay-up subsystem 55. Full or loaded wire canisters 20 are placed into the wire queuing subsystem 50 by the robot 95 and when needed are rotated 180° into the work space occupied by the robot 110. The robot 110 of the wire lay-up subsystem 55 uses the wire canister 20 of the present invention to dispense the wire segment 77, dock an end of the wire segment 77, route the wire segment 77 through a preprogrammed course over a form board 115 to generate the wire harness 15, perform connector insertion on each wire segment 77 and tie the completed harness 15 together. After the wire segment 77 has been dispensed from the canister 20, the robot 110 places the canister 20 back into the wire queuing subsystem 50 to be rotated back into the work space of the wire termination subsystem robot 95.

Figure 2:
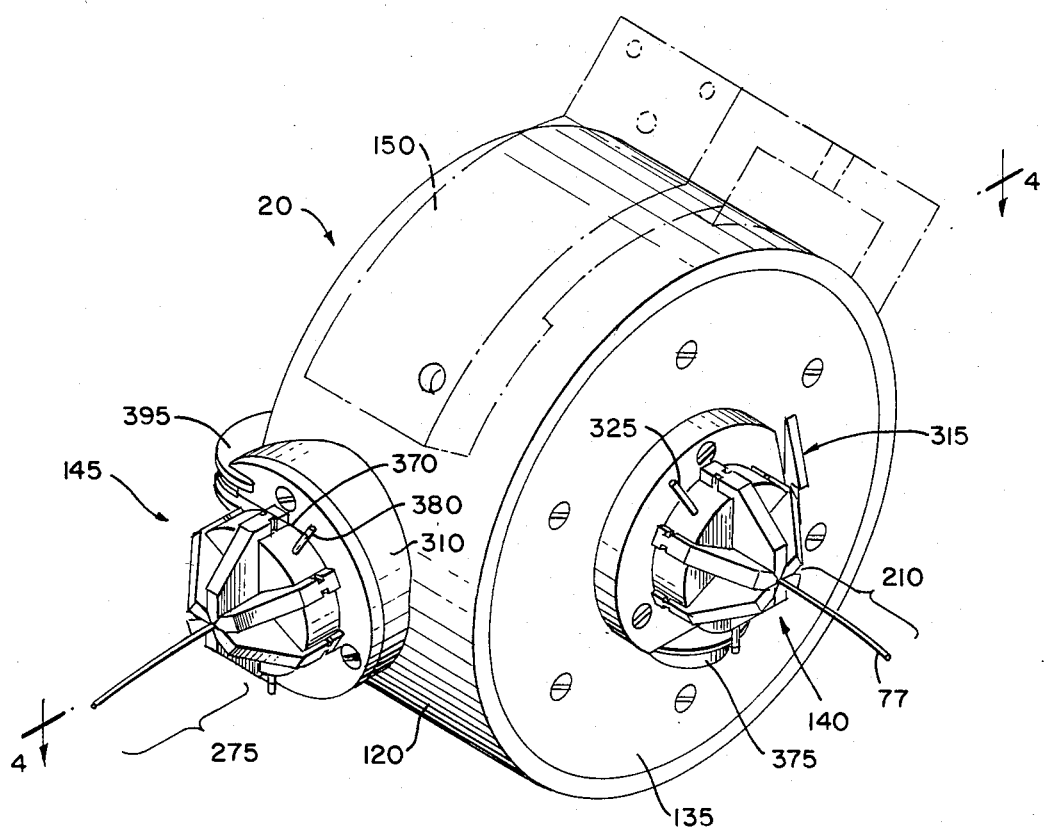
FIG. 2 illustrates an isometric view of the preferred embodiment of the wire canister of the present invention.
Figure 3:
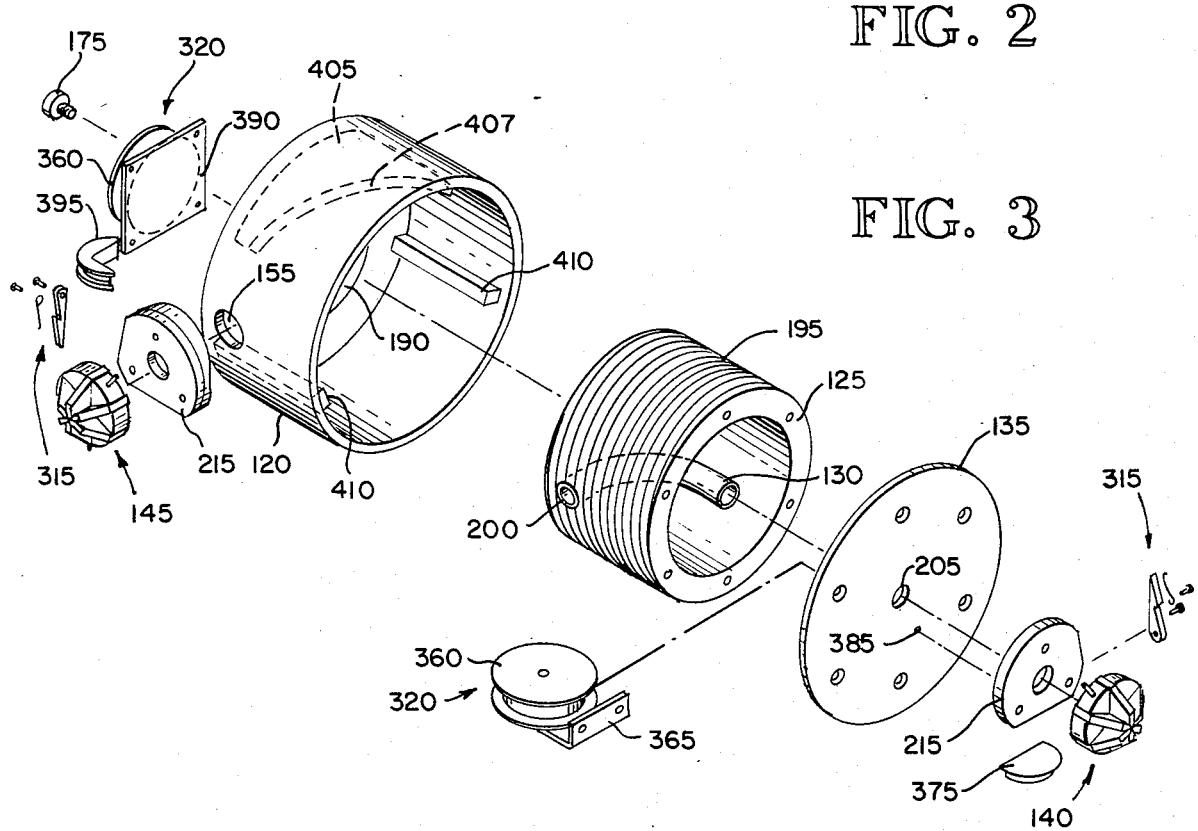
FIG. 3 is an exploded isometric view of the preferred embodiment of the present invention.

A preferred embodiment of the wire canister 20 of the present invention is shown in FIGS. 2 and 3. The wire canister 20 comprises a housing 120, a cylindrical drum 125, a 90° elbow shaped wire guide tube 130, a rotatable drive plate 135, a first or a center chuck assembly 140 and a second or a rim chuck assembly 145 for clamping and centering the ends of a wire segment 77 thereby facilitating the acquisition of the ends by a robot. A robot manipulator interface adapter mount 150 is also shown in phantom in FIG. 2. The adapter mount 150 may be used to allow a robot to acquire and utilize the wire canister 20.

Figure 4:
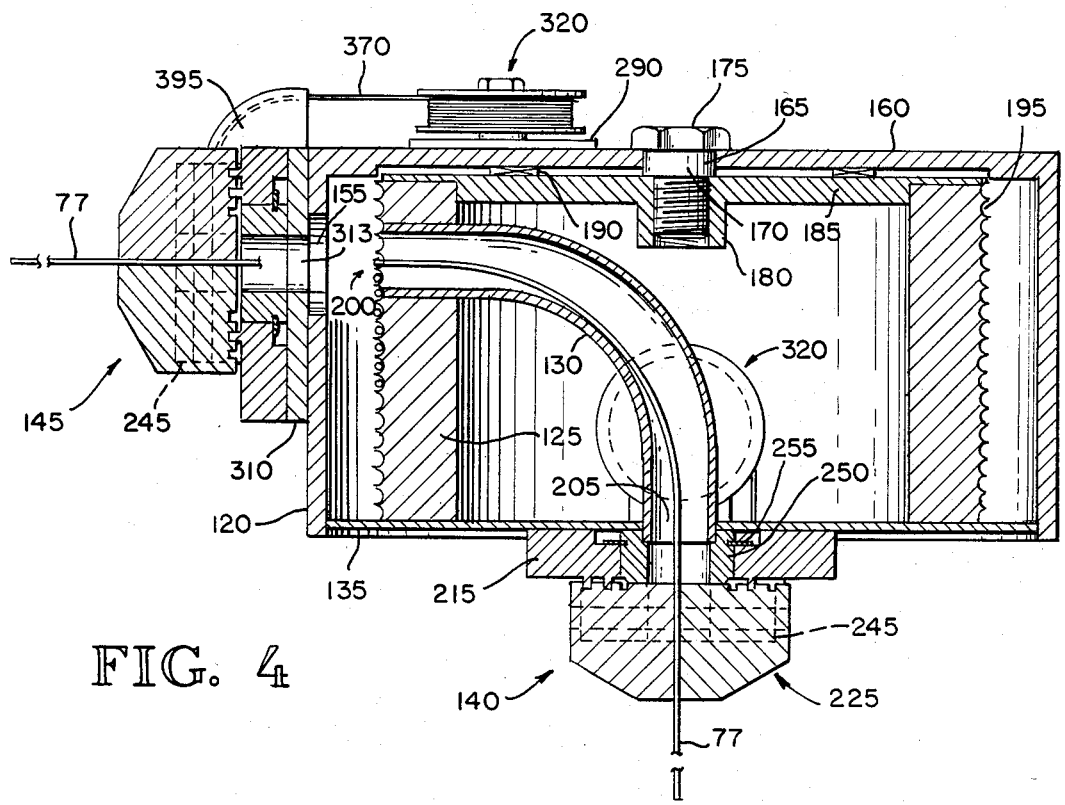
FIG. 4 is a cross-sectional side view taken along lines 4—4 of the preferred embodiment of the present wire canister of FIG. 2.

The housing 120 is illustrated as a cylindrical shell having an access opening 155 permitting the passage of a wire 75 therein. A cover plate 160, integral with the housing 120, is provided with a bore 165 (see FIG. 4). The bore 165 is adapted to receive a sleeve 170 that carries a rotatable bolt 175.

The bolt 175 is adapted to be received and affixed in a socket 180 formed in an end plate 185 attached to the drum 125 disposed within the housing 120. A needle bearing 190 is juxtaposed between the cover plate 160 of the housing 120 and the end plate 185 of the drum thereby enabling the drum 125 to rotate with respect to the housing 120. Disposed upon the outer periphery of the drum 125 is a helical thread or a groove 195 upon which a wire 75 of varied dimensions may be wound. The drum 125 is also provided with an inlet opening 200 allowing the insertion and passage of a wire 75 through the drum 125. When the wire canister 20 is to be loaded at the wire reeling subsystem 40, the inlet opening 200 is initially aligned with the access opening 155 to allow the insertion of the wire 75 as will be better understood hereinafter.

The drive plate 135 is affixed to the rotatable drum 125 and is adapted to fit and rotate within the cylindrical housing 120 whereby a rotation of the drive plate 135 effects a rotation of the rotatable drum 125. The drive plate 135 is provided with a wire outlet opening 205 allowing the egress or exit of the leading end 210 of the wire 75 from the rotatable drum 125 (see FIG. 2). Disposed and affixed within the rotatable drum 125 is the 90° elbow shaped wire guide tube 130 which is affixed to the inner wall of the drum 125 and extends from the inlet opening 200 to the outlet opening 205 where it is attached to the drive plate 135. The guide tube 130 accepts the initial insertion of the leading end 210 of the wire 75 and conducts it to the outlet opening 205 whereafter the leading end 210 of the wire 75 is inserted into and centered within the center chuck assembly 140.

The center chuck assembly 140 and the rim chuck assembly 145 are substantially similar in structure with some minor differences to be pointed out hereinafter. The center chuck assembly 140 and the rim chuck assembly 145 both comprise a scroll plate 215, a chuck 210, and a plurality of slidable jaws 225 (see FIGS. 5-13).

The scroll plate 220 comprises a circular ring 227 having a central circular opening 230 and a plurality of countersunk bores 235 adapted to receive fasteners (not shown) for mounting the scroll plate 215. The scroll plate 215 is also provided with a plurality, preferably three (3), arcuate scrollwork protuberances 240 (see FIG. 8) and two mounting surfaces 241, 243.

The chuck 220 comprises a cylindrical head 245 and an integral cylindrical fitting or a plug 250 adapted to be received within the central opening 230 of the scroll plate 215 (see FIGS. 6, 9 and 10). The fitting 250 is retained within the central opening 230 of the scroll plate 215 and the chuck 220 is allowed to rotate with respect to the scroll plate 215 by means of a retaining ring 255 received within a circular groove 260 formed within the fitting 250. A central wire conducting passageway 265, located along the central longitudinal axis shared by the cylindrical head 245 and the fitting 250 is formed within the cylindrical head 245 and the fitting 250. As can be seen from FIG. 4, one end of the guide tube 130 fits in the passageway 265 of the center chuck assembly 140. A plurality, preferably six (6), H-shaped recesses 270 extend from the central passageway 265 to the outer periphery of the cylindrical head 245. The recesses 270 are adapted to receive the slidable jaws 225 which, as will be seen, cooperate to grip or constrain either the leading end 210 or the trailing end 275 of the wire segment 77.

As seen from FIGS. 11-13, each jaw 225 comprises a triangular shaped knife edge 280, sides 285 and a lower surface 290. The sides 285 are provided with a channel 295, extending transversely to the knife edge 280, and adapted to be received within an H-shaped recess 270 of the cylindrical head 245. Each H-shaped recess 270 constrains the motion of the jaw 225 to a sliding motion along the radial direction defined by the recess 270. The lower surface 290 is provided with a plurality, i.e., in the present case, three (3) arcuately shaped teeth 300 which are adapted to mate or cooperate with the scrollwork protuberances 240 defined on the scroll plate 215. Sliding of each jaw 225 is obviously made possible by the interengagement between the arcuate scrollwork protuberances 240 and the arcuate teeth 300 formed on the lower surface 290 of each jaw 225.

As will be readily seen, a rotation of the chuck 245 with respect to the scroll plate 215 effects either a closing or an opening of a chuck assembly, i.e., the slidable jaws 225 are urged either into contact as shown in FIG. 5 or urged away from this contact. In the closed position the jaws 225 are capable of pinching, gripping or constraining an end of a wire. In the open position, free passage of the wire through a chuck assembly is possible.

The center chuck assembly 140 and the rim chuck assembly 145 may be assembled as follows. A jaw 225 is inserted into each of the H-shaped recesses 270 and slid inwardly towards the central passageway 265 until the leading portion or tip 305 of each of the knife edges 280 of the jaws 225 are in abutment (see FIG. 5). The cylindrical fitting 250 may then be inserted into the central opening 230 of the scroll plate 215 and the teeth 300 of each of the jaws 225 placed in contact with the scrollwork protuberances 240. After insuring that all of the jaws 225 are properly positioned and that all of the teeth 300 of the jaws 225 engage the scrollwork protuberances 240, the retaining ring 255 may be inserted within the circular groove 260 formed within the fitting 250.

The scroll plate 215 for the center chuck assembly 140 may be fastened to the drive plate 135 by means of appropriate fasteners (not shown) that pass through the countersunk bores 235 formed within the scroll plate 215. For ease of illustration, the scrollwork protuberances 240 on the scroll plates 215 depicted in FIG. 3 have not been shown. After assembly, the passageway 265 is in alignment with the outlet opening 205. The scroll plate 215 of the rim chuck assembly 145 is affixed to the housing 120 by means of a rim chuck assembly mount adapter 130 (shown more clearly in FIG. 2) adapted to be attached to the housing 120. The rim chuck assembly mount adapter 310 is also provided with a central opening 313 (see FIG. 4) that is aligned with the wire conducting passageway 265 and the access opening 155 formed in the housing 120.

The chuck assembly depicted in FIGS. 5-13 has been simplified in order to show the above described structural elements more clearly. However, both the center chuck assembly 140 and the rim chuck assembly 145 also comprise a releasable mechanism 315 for latching the chuck 220 to prevent a rotation of the chuck 220 and a biasing mechanism 320 for rotating the chuck after the chuck is unlatched.

More specifically, the releasable latching mechanism 315 and the biasing mechanism 320 are shown more clearly in FIGS. 14-18. The latching and biasing mechanism for the center chuck assembly 140 and the rim chuck assembly 145 are substantially similar with the following description being directed solely at the mechanisms 315, 320 for the center chuck assembly 140. Any differences in structure in the mechanisms for the rim chuck assembly 145 will be pointed out subsequently.

The latching mechanism 315 for the center chuck assembly comprises a latch pin 325 attached to the chuck 220, a pivotable latch 330 and a biasing spring 335. The pin 325 is mounted in and extends radially outwardly from the cylindrical head 245 of the chuck 220. The latch 330 is provided with a ramp surface 340 and is pivotally attached to the mounting surface 241 of the scroll plate 215 as by a pin 345. The latch 330 is provided with a detent 350 and is biased towards the pin 325 by means of the spring 335 appropriately fastened to the mounting surface 241 of the scroll plate 215. The pivotable motion of the latch 325 towards the pin 325 is limited by a pin 355.

In use, the chuck 220 may be rotated relative to the scroll plate 215 to effect an opening of the jaws 225 from the closed condition or position shown in FIG. 14 to the open position shown in FIG. 17. Concomitantly, the pin 325 is rotated to a position wherein it contacts the ramp surface 340 and moves the pivotable latch 330 against the force of the spring 335. Upon further rotation of the chuck 220, the pin 325 is received in the detent 350 of the pivotable latch 330 whereby the rotation of the chuck 220 is constrained in one direction. As will be better understood hereinafter, the biasing mechanism 320 attempts to promote rotation of the chuck 220 in the direction which is constrained by the latching mechanism 315.

The biasing mechanism 320 for the center chuck assembly 140 comprises a reel 360, a mount 365 for the reel 360 (see FIG. 3), a line 370 which may be wound onto the reel 360, an arcuate line guide 375, and a post 380 for fastening an end of the line 370. As may be seen from FIGS. 15 and 16 and more particularly FIG. 3, the reel 360 is rotatably mounted upon the mount 365 disposed within the drum 125 and attached to the drive plate 135. The reel 360 is biased, as by an internal spring 363 (see FIG. 18), to cause it to rotate in a predetermined direction. A line 370 may be wound upon the reel 360 whereby if the line 370 is played out from the reel 360, the spring-biased reel 360 provides an opposite tensile force to urge the line 370 to be rewound upon the reel 360. One end of the line 370 passes through a bore 385 (see FIG. 3) in the drive plate 135 and is directed by the line guide 375, affixed to the surface 243 of the scroll plate 215 of the center chuck assembly 140, to the post 380 that is affixed to and extends radially outwardly from the chuck 220. As seen from FIGS. 14 and 17, the pin 325 and the post 380 may be positioned diametrically opposite each other.

When the chuck 220 of the center chuck assembly 140 is rotated, e.g., in a clockwise direction as seen in FIG. 14, the jaws 225 will be urged from the closed portion of FIG. 14 to the open position seen in FIG. 17. At the same time, the line 370 will be unwound from the reel 360 (see, e.g., FIG. 18). However, under the urging of the spring-biased reel 360 the line 370 will tend to urge the chuck 220 to rotate in an opposite direction and if unlatched the chuck 220 would rotate back to the closed position shown in FIG. 14. However, upon sufficient rotation of the chuck 220 with respect to the scroll plate 215, the pin 325 will contact the ramp surface 340 of the latch 330 thereby depressing it whereafter the pin 325 will fall into the detent 350, as explained earlier.

When the pin 325 has been received in the detent 350 the center chuck assembly 140 will be in its latched position, the rotation of the chuck 220 will be constrained and the slidable jaws 225 will have been urged into the open position shown in FIG. 17; ready to receive the passage of the leading edge 210 of a wire 75. When it is desired to unlatch or close the center chuck assembly 140, release the chuck 220 and urge the jaws 225 to the closed position shown in FIG. 14 whereby the leading end 210 of a wire 75 may be constrained, the pivotable latch 330 is depressed by a suitable means (not shown) thereby releasing the pin 325 from its secured position within the detent 350. Concomitantly, the line 370 will be rewound onto the spring-biased reel 360 thereby causing a counter rotation of the chuck 220 with respect to the scroll plate 215 with the result that the jaws 225 will be slid to the closed position shown in FIG. 14 (see also FIG. 2).

The latching mechanism 315 and the biasing mechanism 320 for the rim chuck assembly 145 operates in the same way as the mechanisms 315, 320 for the center chuck assembly 140. However, as can be seen from FIG. 3, the spring-biased reel 360 is mounted upon a flat mounting plate 390 affixed to the cover plate 160 of the housing 120. Furthermore, the line 370 is trained by a right-angled line guide 395 affixed to the cover plate 160 and to the rim chuck assembly adapter mount 310.

As was alluded to earlier, continuous lengths of wire 75 are cut into discrete wire segments 77 of arbitrary but known lengths by the wire preparation subsystem 35 in conjunction with the wire reeling subsystem 40. The wire reeling subsystem 40 controls the loading of wire segments 77 into the wire canister 20 as it is being fed from the wire preparation subsystem 35. The wire reeling subsystem 40 has not been described in detail because it forms no part of the present invention. However, the function of the wire reeling subsystem 40 and a use of the wire canister 20 of the present invention should be understood by referring to FIGS. 19–21.

Figure 19:
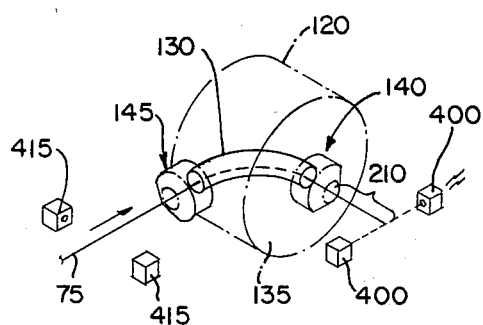
FIGS. 19, 20 and 21 partially illustrate the operation of the preferred embodiment of the wire canister of the present invention.

At the start of the wire loading process, the chucks 220 of both the center chuck assembly 140 and the rim chuck assembly 145 are rotated to effect an opening of the jaws 225 and latched by the latching mechanism 315, as described above. A suitable mechanism (not shown) is coupled to the drive plate 135 whereby rotation of the drum 125 may be effected. Initially, the drum 125 is rotated to align the inlet opening 200 with the access opening 155, as schematically shown in FIG. 19 (see also FIG. 4). While not shown, a wire entry guide is preferably inserted into the rim chuck assembly 145 to assure successful feeding of the first or leading end 210 of the wire 75 through the wire canister 20. As wire is fed from the wire preparation subsystem 35 the leading end 210 progresses through the canister 20 to the center chuck assembly 140. Centering of the wire 75 is desirable to assure proper gripping of the wire 75 when the jaws 225 of the center chuck assembly 140 are urged into a closed position.

When the leading end 210 of the wire 75 reaches sensors 400, disposed at a desired distance from the center chuck assembly 140, a signal is sent to the wire preparation subassembly 35 to cease the feeding of the wire 75 through the wire canister 20. The center chuck assembly 140 is then unlatched allowing the biasing mechanism 320 to effect a closing of the center chuck assembly (see FIG. 20) wherein the jaws 225 grip the leading end 210 of the wire 75 (see FIG. 2) and center it within the chuck assembly whereby the manipulator of a robot may readily acquire the end 210.

Figure 20:
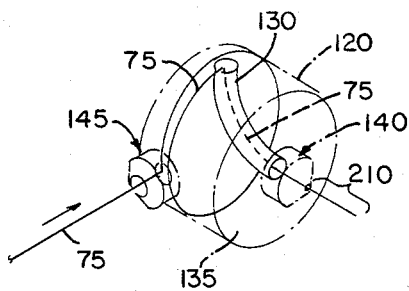
Figure 21:
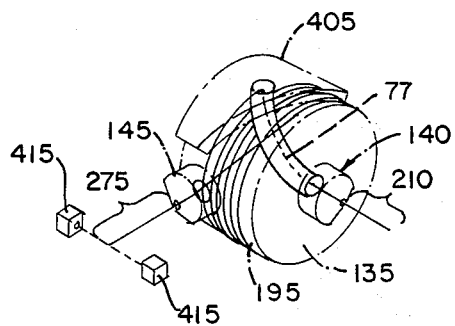

Rotation of the drum 125 is again commenced thereby allowing the wire 75 to be fed into the wire canister 20 as shown in FIGS. 20 and 21. A wire feed guide bar 405 having an arcuate edge 407 leading away from the inlet opening 200 is affixed to the interior of the housing 120. The bar 405 is disposed proximate the groove 195 so that during rotation of the drum 125 the wire 75 is directed to the groove 195 whereby the wire 75 may be wound upon the drum 125. (The bar 405 has not been illustrated in FIG. 20 for purposes of clarity). A pair of wire retaining blocks 410, affixed along the interior of the housing 120 and disposed proximate the groove 195, prevent the wire 75 from escaping the groove and jamming the canister 20. The length of the wire 75 being wound upon the drum may be monitored (by a rotation sensor, not shown) and measured against the length of wire indicated by the wire preparation subsystem 35 as having been fed to the wire canister 20. The end of the wire is then cut by the wire preparation subsystem 35 to form the wire segment 77 and the rotation of the drum 125 is stopped leaving the trailing end of the wire segment extended through and centered within the rim chuck assembly 145. The wire entry guide (not shown) is now removed from the rim chuck assembly 145. Upon the sensing of the trailing end 275 of the wire segment 77 by sensors 415 disposed proximate the rim chuck assembly 145, the chuck 220 of the rim chuck assembly 145 may be released thereby constraining and centering the trailing end 275 of the wire segment 77.

Excess wire extending from and centered within each chuck assembly may be trimmed to a desired precise length from each of the chuck assemblies by the wire termination subsystem 45. Subsequently, the robot 110 in the wire lay-up subsystem 55 may acquire and use a loaded wire canister 20 of the present invention (in a way not shown) to assemble the wire harness 15. Because the canister 20 can be precisely oriented in the wire queing subsystem 50 and proximate the manipulator of the robot 110, no problems should be experienced by the robot 110 in determining the location of each of the ends 210, 275 of the wire segment 77 whereby the assembly of the wire harness 15 may be readily, predictably and reliably assembled.

Many changes and modifications in the above described embodiment of the invention can, of course, be carried out without departing from the scope thereof. Accordingly, that scope is intended to be limited only by the scope of the appended claims.

What is claimed and desired to be secured by Letters Patent of the United States is:

1. A transportable canister for accepting, storing and dispensing a wire segment to be used by a robot during the assembly of a wire harness, comprising:
    a cylindrical housing having an access opening for a wire,
    a cylindrical drum disposed within said housing, the outer surface of said drum being provided with a wire-accepting helical groove and a wire inlet opening,
    means for enabling said drum to rotate with respect to said housing,
    a drive plate attached to said drum whereby a rotation of said drive plate effects a rotation of said drum, said drive plate being provided with a wire outlet opening,
    a wire guide tube disposed within said drum and extending between said inlet opening and said outlet opening,
    means forming a first releasable clamp for constraining and centering the leading end of said wire segment, said first clamp means being disposed at said outlet opening, and
    means forming a second releasable clamp for constraining and centering the trailing end of said wire segment, said second releasable clamp means being disposed at said access opening;
    whereby in use said drive plate and thus said drum may be rotated to initially align said inlet opening with said access opening and subsequently wind said wire into said groove.

2. The canister of claim 1, further comprising means for guiding said wire from said inlet opening to said groove.

3. The canister of claim 2, further comprising means for retaining said wire in said groove.

4. The canister of claim 3, wherein said enabling means comprises:
    an end plate attached to said housing, said end plate having a bore and supporting a sleeve adapted to be received by said bore;
    a bolt affixed to said drum and passing freely through said sleeve, whereby said bolt may rotate with respect to said housing; and
    a needle bearing juxtaposed between said end plate and said drum.

5. The canister of claim 4, wherein one open end of said guide tube is affixed to the inner peripheral wall of said drum and alignable with said inlet opening, the other open end of said guide tube is affixed to said drive plate and aligned with said outlet opening.

6. The canister of claim 5, wherein said first and said second clamp means each comprises:
    a scroll plate having a central circular opening, said scroll plate being provided with a plurality of arcuate scrollwork protuberances;
    a chuck having a cylindrical plug received within said scroll plate opening to allow said chuck to be rotated with respect to said scroll plate, said chuck being provided with a bore coaxial with said scroll plate opening, said chuck having a plurality of recesses extending radially outwardly from said bore to the outer periphery of said chuck;
    a jaw adapted to slide within each of said recesses, each jaw being provided with a plurality of arcuate teeth adapted to cooperate with said scrollwork protuberances whereby when said chuck is rotated, each of said jaws will be urged to either slide to a closed position wherein said wire segment may be constrained or slide to an open position wherein said wire may be released;
    releasable means for latching said chuck and preventing the rotation of said chuck after said jaws have been urged toward an open position, and
    means for rotating said chuck after said chuck is unlatched to cause said jaws to be urged to a closed position.

7. The canister of claim 6, wherein said releasable means comprises a first pin extending from said chuck, a latch spring-biased towards said pin, said latch having a detent adapted to receive said pin, whereby said chuck can be rotated to a latched position wherein said pin is received in said detent and the rotation of said chuck is prevented.

8. The canister of claim 7, wherein said chuck rotating means comprises a rotatable reel upon which a line may be wound, said reel being spring-biased to a position wherein said line maybe wound upon said reel, a post extending from said chuck, said line being attached to said post, whereby when said chuck is rotated to urge said jaws to an open position, said line is unwound from said spring-biased reel and when said chuck is unlatched, said line is rewound onto said spring-biased reel thereby rotating said chuck and urging said jaws to a closed position.

9. The canister of claim 3, wherein said wire guide means comprises a bar having an arcuate edge, said bar being affixed within said housing and positioned proximate said groove, said arcuate surface leading away from said inlet opening and being capable of directing said wire segment away from said inlet opening to said groove.

10. The canister of claim 9, wherein said wire segment retaining means comprises a plurality of blocks extending within said housing along said drum and being positioned proximate said groove.

* * * * *